(12) United States Patent
Hung et al.

(10) Patent No.: US 9,160,451 B2
(45) Date of Patent: Oct. 13, 2015

(54) ACTIVE OPTICAL CABLE CONNECTOR PLUG AND ACTIVE OPTICAL CABLE USING SAME

(71) Applicant: SAE Magnetics (H.K.) Ltd., Hong Kong (HK)

(72) Inventors: Vincent Wai Hung, Hong Kong (HK); Kwok Leung Wong, Hong Kong (HK)

(73) Assignee: SAE MAGNETICS (H.K.) LTD., Hong Kong (HK)

( * ) Notice: Subject to any disclaimer, the term of this patent is extended or adjusted under 35 U.S.C. 154(b) by 289 days.

(21) Appl. No.: 13/767,888

(22) Filed: Feb. 15, 2013

(65) Prior Publication Data

US 2013/0236188 A1 Sep. 12, 2013

Related U.S. Application Data

(60) Provisional application No. 61/607,002, filed on Mar. 6, 2012.

(51) Int. Cl.
*G06F 13/38* (2006.01)
*H04B 10/2575* (2013.01)
*H04B 10/25* (2013.01)

(52) U.S. Cl.
CPC ............ *H04B 10/2575* (2013.01); *H04B 10/25* (2013.01)

(58) Field of Classification Search
None
See application file for complete search history.

(56) References Cited

U.S. PATENT DOCUMENTS

| 2002/0046355 A1* | 4/2002 | Takeuchi ............. G06F 1/3203 713/320 |
| 2005/0054289 A1* | 3/2005 | Salazar et al. .................. 455/39 |
| 2006/0008276 A1* | 1/2006 | Sakai et al. .................... 398/141 |
| 2007/0237462 A1* | 10/2007 | Aronson ............. G02B 6/4416 385/89 |
| 2009/0196621 A1* | 8/2009 | Chen ............................. 398/115 |
| 2011/0229087 A1* | 9/2011 | Cody et al. ...................... 385/78 |
| 2012/0000705 A1* | 1/2012 | Cornelius et al. ........... 174/84 R |

* cited by examiner

Primary Examiner — Michael Sun

(57) ABSTRACT

An active optical cable connector plug includes: an electrical interface configured to connect to a first electronic device; an optical interface configured to connect to an optical cable, the optical cable being configured to connect to a second electronic device; an electrical-to-optical circuitry being connected with the electrical interface and the optical interface and configured to convert a received electrical signal to an optical signal; an optical-to-electrical circuitry being connected with the electrical interface and the optical interface and configured to convert a received optical signal to an electrical signal; a plug-in detection block being connected to the electrical interface and configured to detect the electrical properties of the first electronic device; a plug-in emulation block being connected to the electrical interface and configured to emulate the electrical properties of the second electronic device.

26 Claims, 16 Drawing Sheets

ACTIVE OPTICAL CABLE CONNECTOR PLUG AND ACTIVE OPTICAL CABLE USING SAME

CROSS-REFERENCE TO RELATED APPLICATIONS

This application claims the benefit of U.S. Provisional Patent Application No. 61/607,002 filed on Mar. 6, 2012; the contents of which is hereby incorporated by reference.

FIELD OF THE PATENT APPLICATION

The present patent application generally relates to electrical and optical communication technologies and more specifically to an active optical cable connector plug and an active optical cable using the active optical cable connector plug that enable plug-in detection compatible with the existing protocols based on copper cables.

BACKGROUND

Modern high-speed data bus standards, such as USB 3.0, DisplayPort, mini DisplayPort, HDMI, and etc., are using copper wires as the data transmission medium. It is beneficial to replace copper wires with optical fibers for the following advantages:
1. Supporting longer transmission distances with less signal attenuation than copper wires;
2. Supporting higher data rate;
3. Reducing jitter due to unmatched wire lengths in the differential pair;
4. Reducing EMI issues due to unmatched impedances;
5. Cheaper cable material costs;
6. Reducing the cable size.

In order to initiate a data transmission, the first data node attached to one end of the cable must actively detect plug-in of the second data node at the opposite end of the cable. This detection process is sometimes also used to identify the type of the node (host, device, hub, and etc.) connected to the cable ends. In a conventional implementation through copper media, the plug-in detection is accomplished through detection of changes of certain electrical properties across copper wires in the cable.

FIG. 1 illustrates two data nodes being connected by a copper cable in a conventional implementation. Referring to FIG. 1, when the cable plugs into the first node 1, the detection circuitry 11 within node 1 monitors the electrical properties across designated copper wires in the cable. When the second node 2 is connected to the cable, its identity circuitry 22 is also connected to the designated wires thus changing the electrical properties across the wires. The properties can be exhibited in the forms of voltage, resistance, current or any other measurable electrical characteristics. FIG. 2 illustrates the copper cable plug-in detection mechanism.

When the copper wires are replaced by optical fibers, an optical-to-electrical converter is required to convert the electrical signal to optical signal for transmission. The optical signal at the receiving end is converted back to electrical signal by an electrical-to-optical converter. Because of this electrical-optical-electrical conversion, the electrical property change induced by plug-in can no longer be detected across the cable thus breaking the plug-in detection protocol. FIG. 3 illustrates a conventional active optical cable (AOC) without the plug-in detection capability. FIG. 4A illustrates a general AOC structure. FIG. 4B illustrates a general AOC structure with power lines and ground lines.

SUMMARY

The present patent application is directed to an active optical cable connector plug. In one aspect, the active optical cable connector plug includes: an electrical interface configured to connect to a first electronic device; an optical interface configured to connect to an optical cable, the optical cable being configured to connect to a second electronic device; an electrical-to-optical circuitry being connected with the electrical interface and the optical interface and configured to convert a received electrical signal to an optical signal; an optical-to-electrical circuitry being connected with the electrical interface and the optical interface and configured to convert a received optical signal to an electrical signal; a plug-in detection block being connected to the electrical interface and configured to detect the electrical properties of the first electronic device; a plug-in emulation block being connected to the electrical interface and configured to emulate the electrical properties of the second electronic device; and a controller connected to and thereby controlling the electrical-to-optical circuitry, the optical-to-electrical circuitry, the plug-in detection block, and the plug-in emulation block so as to transmit the detected electrical properties of the first electronic device to the second electronic device through the optical interface, and to transmit the emulated electrical properties of the second electronic device to the first electronic device through the electrical interface.

The controller may be configured to transmit an electrical signal to the electrical-to-optical circuitry, and the electrical-to-optical circuitry may be configured to convert the electrical signal to an optical signal and transmit the optical signal through the optical interface in a low speed mode. The optical-to-electrical circuitry may be configured to convert an optical signal received from the optical interface to an electrical signal, and the controller may be configured to receive the electrical signal from the optical-to-electrical circuitry in the low speed mode.

The electrical-to-optical circuitry may be configured to convert a differential electrical signal received from the electrical interface to an optical signal and to transmit the optical signal through the optical interface in a high speed mode. The electrical-to-optical circuitry may include clock and data recovery circuits. The optical-to-electrical circuitry may be configured to convert an optical signal received from the optical interface to a differential electrical signal, and to transmit the differential electrical signal to the electrical interface in the high speed mode. The optical-to-electrical circuitry may include clock and data recovery circuits.

The optical interface may be configured to connect to at least two optical fibers of the optical cable. The optical cable may be further configured to connect to an optical interface of a second active optical cable connector plug. The second active optical cable connector plug may be configured to connect to the second electronic device.

The controller may be configured to enter a wait mode when there is no response from the second active optical cable connector plug, or either one of the first and second electronic devices has not been detected by the optical cable, and to exit the wait mode when there is an incoming optical signal from the second active optical cable connector plug. The controller may be configured to turn off the electrical-to-optical circuitry in the wait mode to save power, and to restart the electrical-to-optical circuitry when exiting the wait mode. The controller may be configured to exit the wait mode when there is a predetermined level change in an external signal input from the first electronic device.

The electrical interface may comply with the USB 3.0 standard, and the electrical properties of the first electronic device detected by the plug-in detection block may include the device type information.

The plug-in emulation block may be configured to emulate the electrical properties of the second electronic device based on the electrical response of connecting a copper cable between the first electronic device and the second electronic device.

In another aspect, the present patent application provides an active optical cable including: an optical cable including at least two fibers with a far end and a near end; a first connector plug connecting to the near end of the optical cable; and a second connector plug connecting to the far end of the optical cable. The first connector plug is configured to connect to a first electronic device. The second connector plug is configured to connect to a second electronic device. Each of the first and second connector plugs includes: an electrical interface configured to connect to the first electronic device at the near end; an optical interface configured to connect to the at least two optical fibers in the optical cable; an electrical-to-optical circuitry being connected with the electrical interface and the optical interface and configured to convert a received electrical signal to an optical signal; an optical-to-electrical circuitry being connected with the electrical interface and the optical interface and configured to convert a received optical signal to an electrical signal; a plug-in detection block being connected to the electrical interface and configured to detect the electrical properties of the first electronic device and transmit the detected electrical properties to the second electronic device; a plug-in emulation block being connected to the electrical interface and configured to emulate the electrical properties of the second electronic device; and a controller connected to and thereby controlling the electrical-to-optical circuitry, the optical-to-electrical circuitry, the plug-in detection block, and the plug-in emulation block so as to transmit the detected electrical properties of the first electronic device to the second electronic device through the optical interface, and to transmit the emulated electrical properties of the second electronic device to the first electronic device through the electrical interface.

The controller may be configured to transmit an electrical signal to the electrical-to-optical circuitry. The electrical-to-optical circuitry may be configured to convert the electrical signal to an optical signal and transmit the optical signal to the far-end electronic device in a low speed mode.

The optical-to-electrical circuitry may be configured to convert a received optical signal to an electrical signal. The controller may be configured to receive the electrical signal from the optical-to-electrical circuitry in the low speed mode.

The electrical-to-optical circuitry may be configured to convert a differential electrical signal received from the electrical interface to an optical signal and to transmit the optical signal through the optical interface in a high speed mode.

The electrical-to-optical circuitry may include clock and data recovery circuits. The optical-to-electrical circuitry may be configured to convert an optical signal received from the optical interface to a differential electrical signal, and to transmit the differential electrical signal to the electrical interface in the high speed mode. The optical-to-electrical circuitry may include clock and data recovery circuits.

The controller may be configured to enter a wait mode when there is no response from the second connector plug, or either one of the first and second electronic devices has not been detected by the optical cable, and to exit the wait mode when there is an incoming optical signal from the second connector plug. The controller may be configured to turn off the electrical-to-optical circuitry in the wait mode to save power, and to restart the electrical-to-optical circuitry when exiting the wait mode. The controller may be configured to exit the wait mode when there is a predetermined level change in an external signal input from the first electronic device.

The electrical interface may comply with the USB 3.0 standard, and the electrical properties of the first electronic device detected by the plug-in detection block may include the device type information.

The plug-in emulation block may be configured to emulate the electrical properties of the first electronic device based on the electrical response of connecting a copper cable between the first electronic device and the second electronic device. The optical cable may include power and ground wires.

BRIEF DESCRIPTIONS OF THE DRAWINGS

DETAILED DESCRIPTION

Reference will now be made in detail to a preferred embodiment of the active optical cable connector plug and the active optical cable using the active optical cable connector plug disclosed in the present patent application, examples of which are also provided in the following description. Exemplary embodiments of the active optical cable connector plug and the active optical cable using the active optical cable connector plug disclosed in the present patent application are described in detail, although it will be apparent to those skilled in the relevant art that some features that are not particularly important to an understanding of the active optical cable connector plug and the active optical cable using the active optical cable connector plug may not be shown for the sake of clarity.

Furthermore, it should be understood that the active optical cable connector plug and the active optical cable using the active optical cable connector plug disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

The present patent application provides an active optical cable (AOC) connector and an AOC using the AOC connector plug. The AOC with the AOC connector plug can be applied to a variety of systems, such as USB 3.0 and the new standard HSIO.

Figure 1:
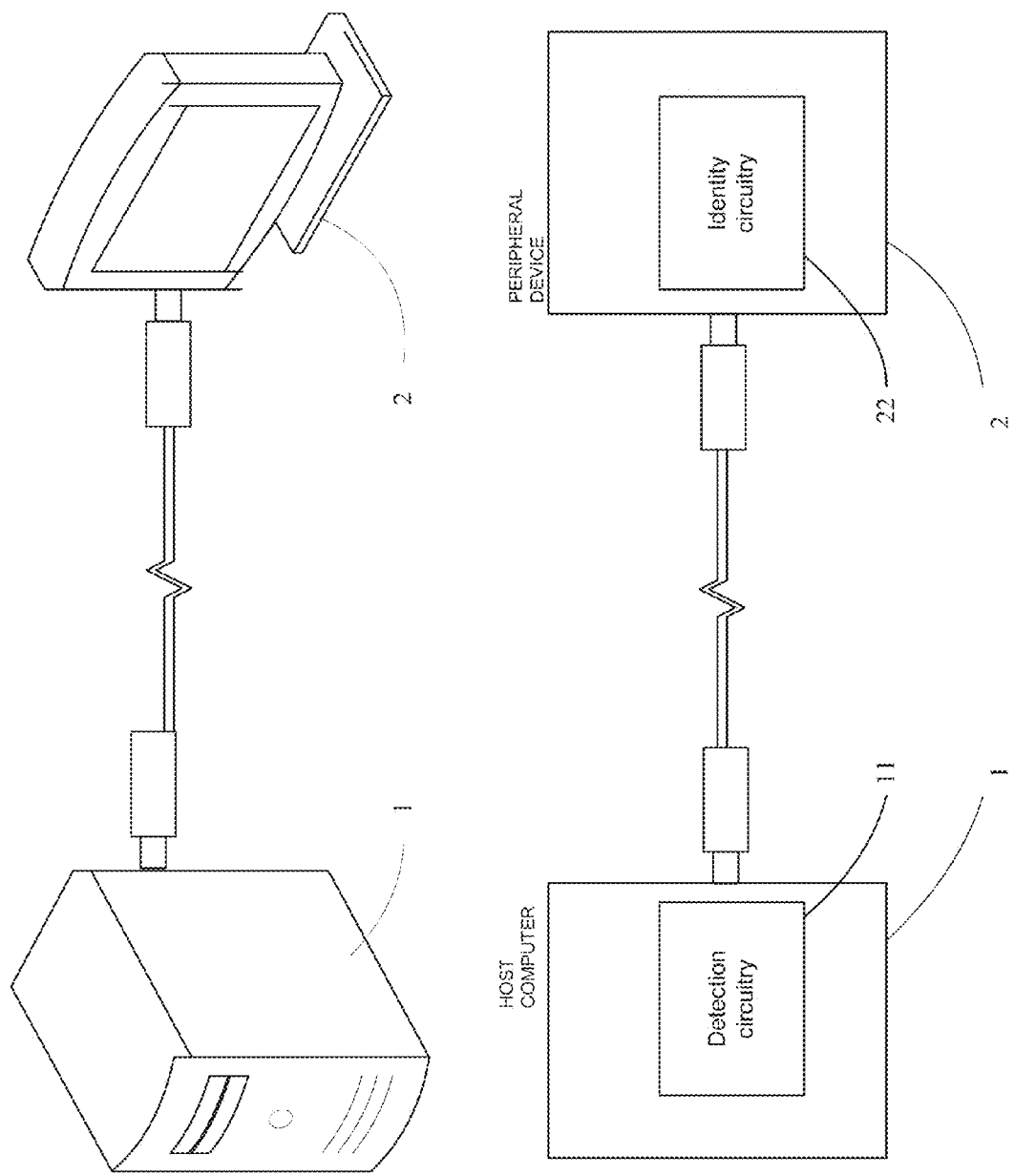
FIG. 1 illustrates two data nodes being connected by a copper cable in a conventional implementation.
Figure 2:
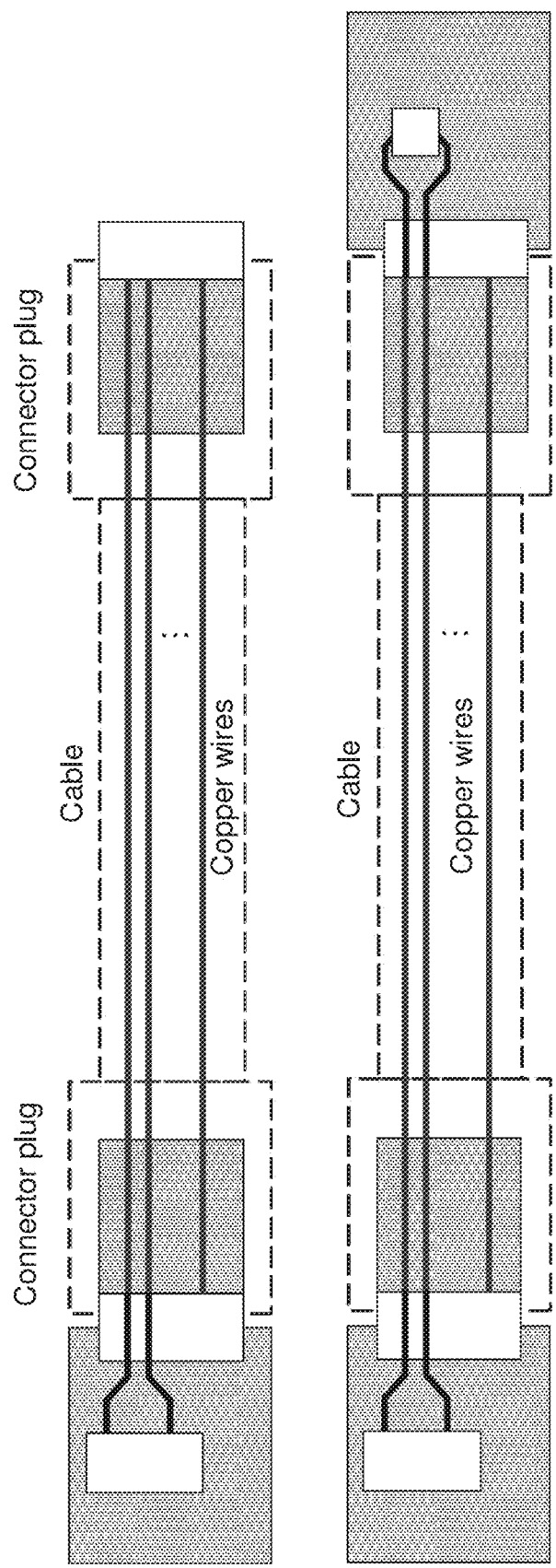
FIG. 2 illustrates the copper cable plug-in detection mechanism.
Figure 3:
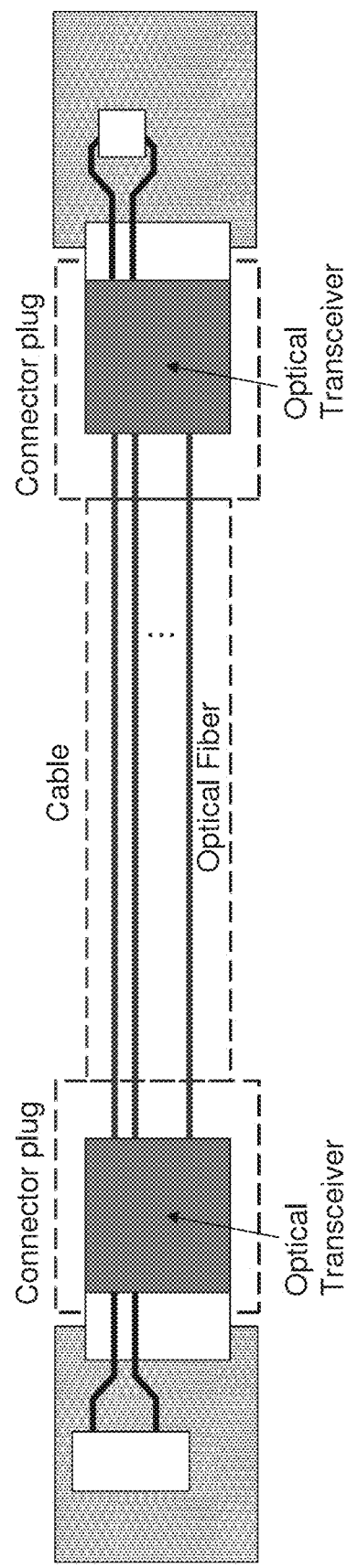
FIG. 3 illustrates a conventional active optical cable (AOC) without the plug-in detection capability.
Figure 4A:
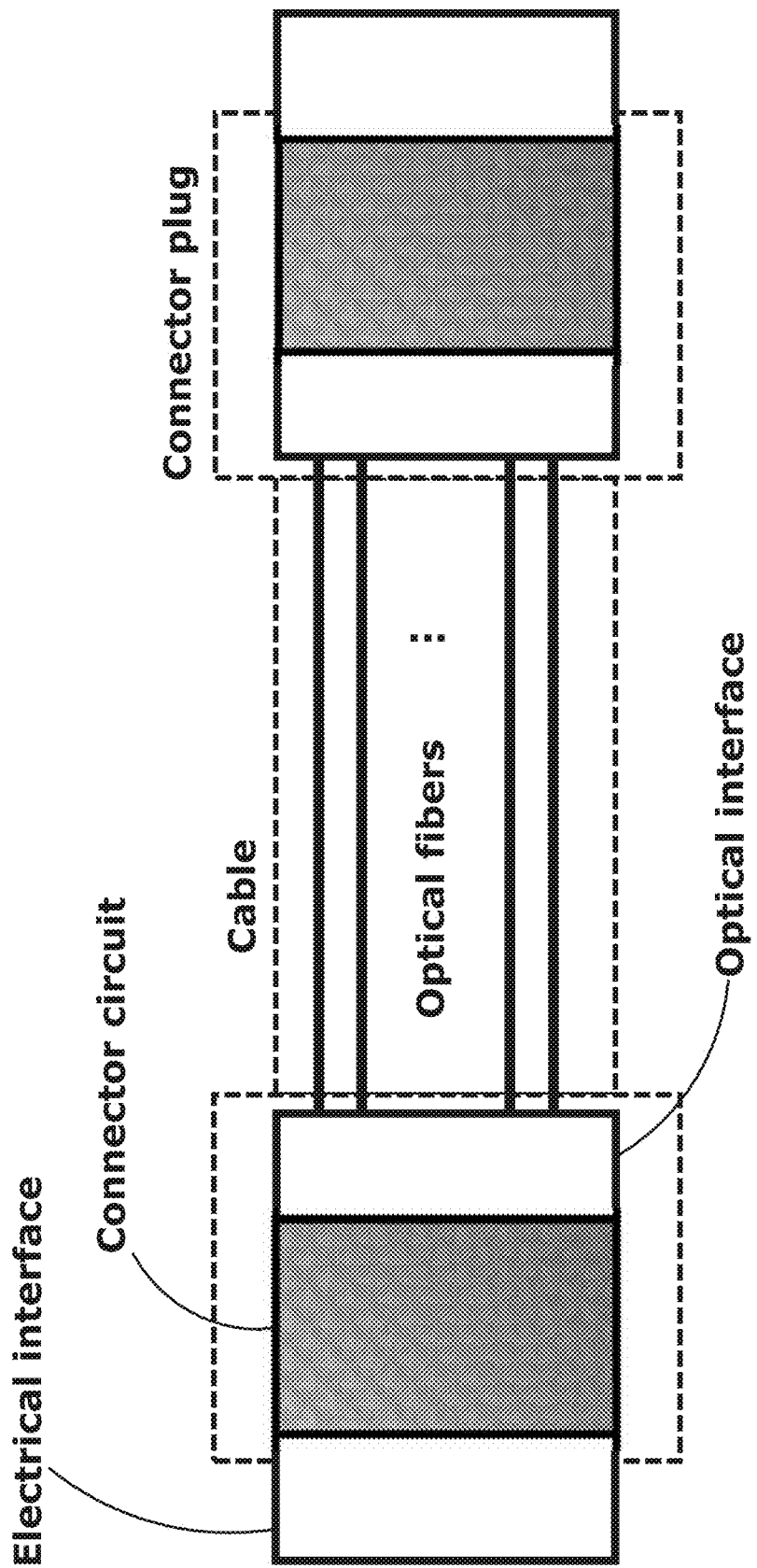
FIG. 4A illustrates a general AOC structure.
Figure 4B:
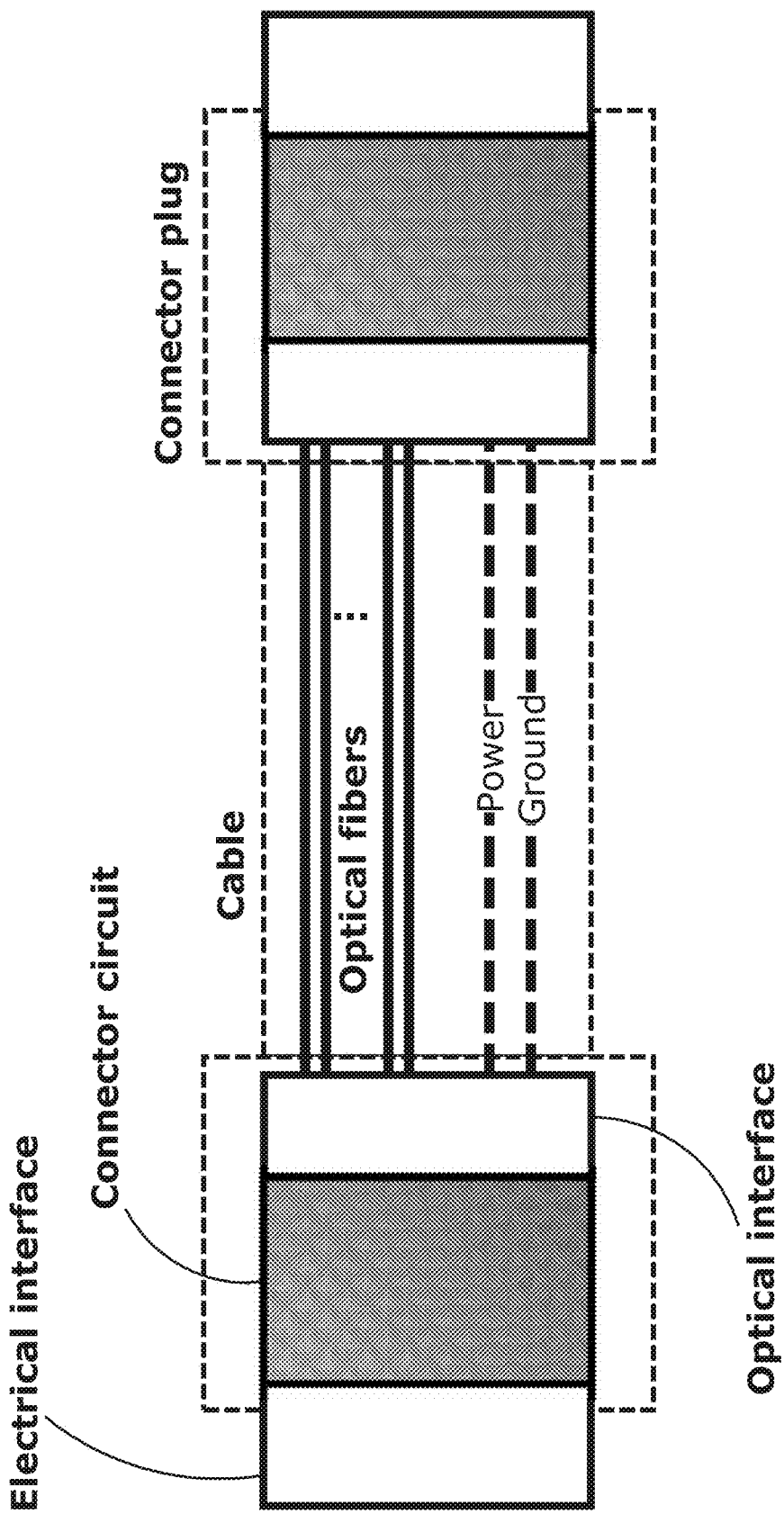
FIG. 4B illustrates a general AOC structure with power lines and ground lines.
Figure 5A:
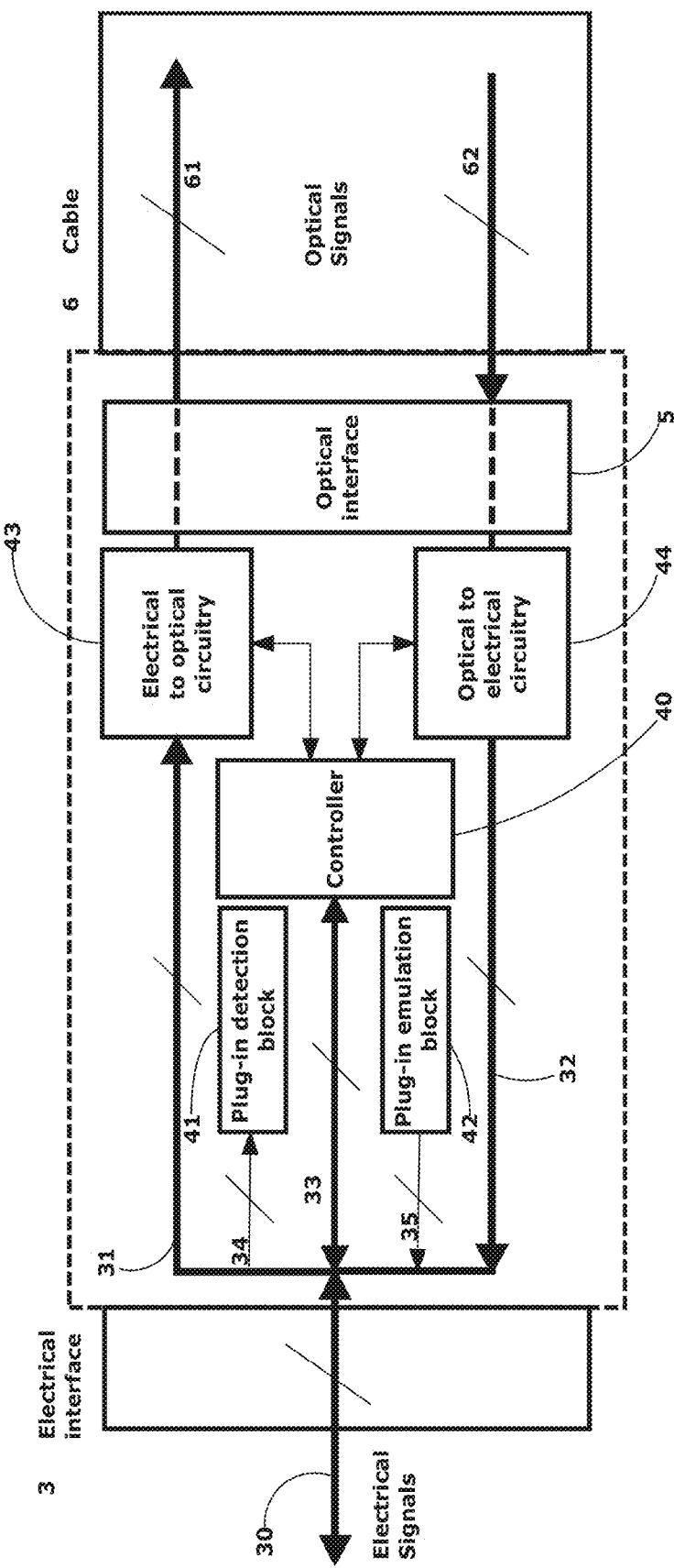
FIG. 5A is a block diagram illustrating the structure of an AOC connector plug according to an embodiment of the present patent application.

FIG. 5A is a block diagram illustrating the structure of an AOC connector plug according to an embodiment of the present patent application. Referring to FIG. 5A, the AOC connector plug includes an electrical interface 3, a cable controller 40, an optical interface 5, an electrical-to-optical circuitry 43, and an optical-to-electrical circuitry 44. The electrical-to-optical circuitry 43 includes at least an optical source (not shown in FIG. 5A). The optical-to-electrical circuitry 44 includes at least one optical detector (not shown in FIG. 5A). The designator 6 in FIG. 5A indicates the cable body (or "cable" in FIG. 5A), while the connector plugs are disposed at the both ends of the cable body 6.

Referring to FIG. 5A, the optical-to-electrical circuitry 44 and the electrical-to-optical circuitry 43 can be operated at both high speed and low speed optical transmission modes, which can be selected by the cable controller. In the high speed optical transmission mode, a differential electrical signal received at the electrical interface 3 is transmitted through the input path 31 into the electrical-to-optical circuitry 43 and is converted to an optical signal and transmitted into the optical fiber 61 through the optical interface 5. On the receiver side, the optical signal from the fiber 62 is received by the optical-to-electrical circuitry 44 and is converted to a differential electrical signal 30 and transmitted into the electrical interface 3 through the output path 32.

When the cable controller 40 drives the optical-to-electrical and electrical-to-optical circuitries 44 and 43 in a low speed optical transmission mode, both of the circuitries 44 and 43 consume less power with a drawback of lower data rate for data being transmitted and received across the AOC. This is mainly used for internal handshaking between the cable controllers 40 or low speed control signal transmission between the devices connected at both ends of the AOC. In this mode, the electrical signal is sent from the cable controller 40 to the electrical-to-optical circuitry 43, converted to an optical signal, and transmitted into the fiber 61 as a low speed optical signal. On the receiver side, the low speed optical signal is received from the fiber 62 and converted into an electrical signal by the optical-to-electrical circuitry 44, and then received by the cable controller 40 for further protocol processing and retransmission into the electrical interface 3. It is noted that in another embodiment, the optical-to-electrical and electrical-to-optical circuitries 44 and 43 contain clock and data recovery circuits.

Figure 5B:
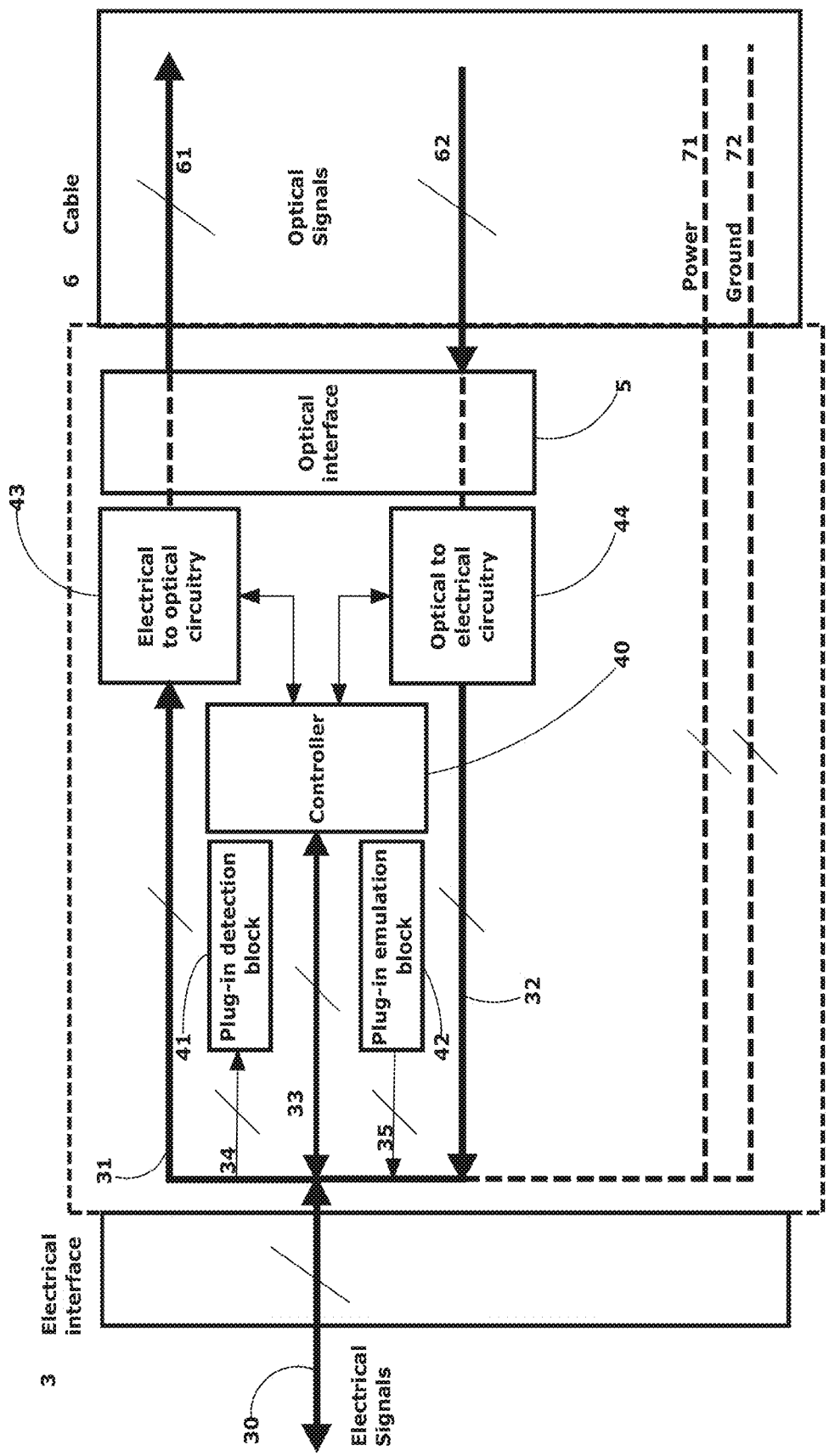
FIG. 5B is a block diagram illustrating the structure of an AOC connector plug with power and ground wires according to another embodiment.

In another embodiment as illustrated in FIG. 5B, the AOC includes the power and ground wires inside the same cable containing the optical fibers. The power and ground wires are copper wires in the embodiment, they are configured to carry power only and not to carry time varying signals so that some of the disadvantages of the copper cables are overcome.

In the above embodiments, the electrical interface 3 is typically, but not limited to, in the form of a plug which is specified by a corresponding standard. Table 1 lists the various standards that the electrical interface 3 may comply with.

TABLE 1

| AOC connector plug formats with different standards | |
| --- | --- |
| Standards | Plug format |
| USB 3.0 | Standard-A, Standard-B, Micro-A, Micro-B |
| HSIO | Mini DisplayPort Compatible |

In the above embodiments, referring to FIG. 5A and FIG. 5B, the electrical interface 3 is further connected to a plug-in detection block (PDB) 41 and a plug-in emulation block (PEB) 42. The PDB 41 in the cable connector plug is connected to the electrical interface 3 through which the electrical properties of the connecting devices can be detected by the AOC. Similarly, the PEB 42 is connected to the electrical interface 3 through which its electrical properties (to emulate a far-end device) can be detected by the near-end device.

Figure 6A:
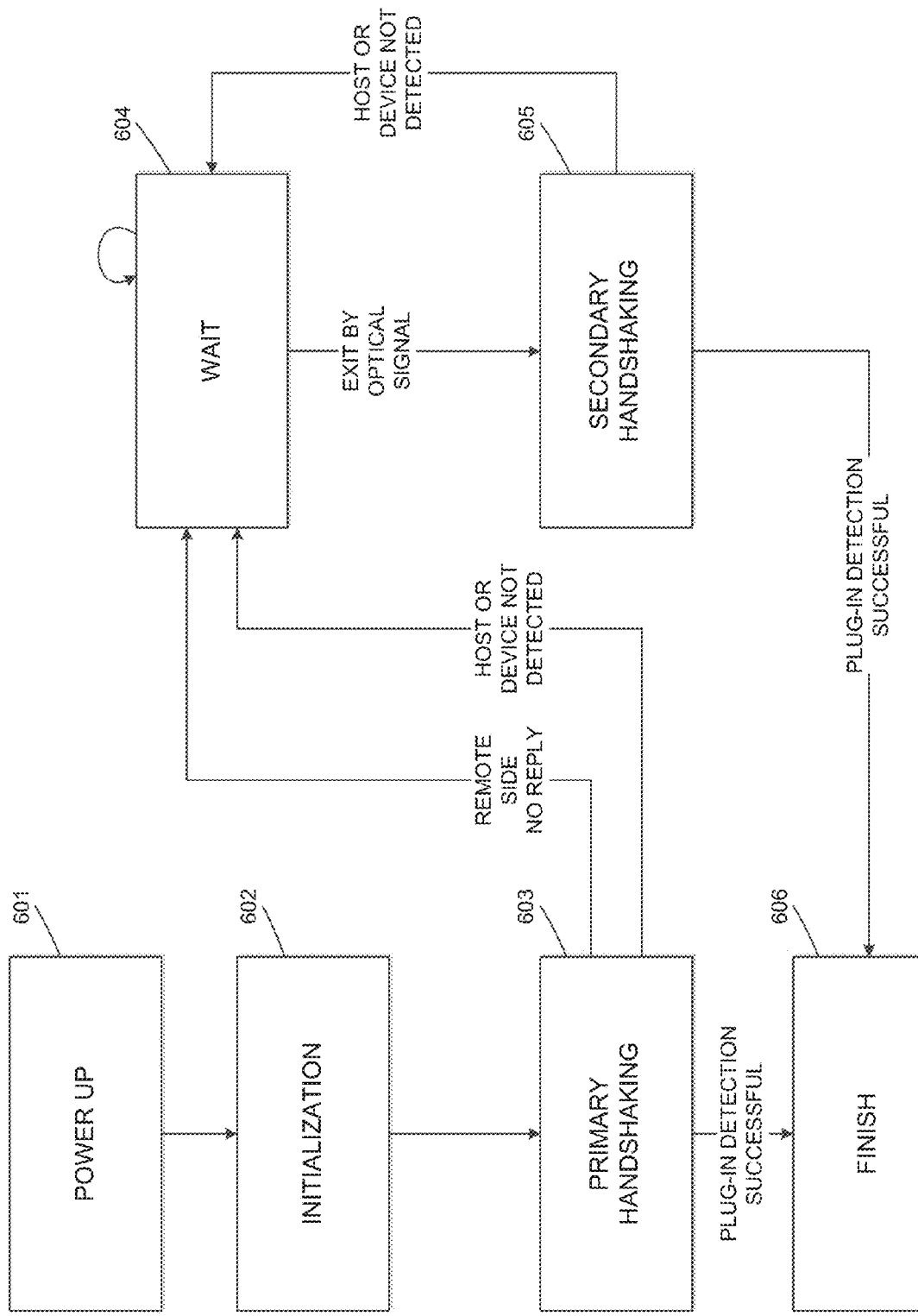
FIG. 6A is a flow chart illustrating a method for plug-in detection using the AOC connector plug according to another embodiment of the present patent application.
Figure 6B:
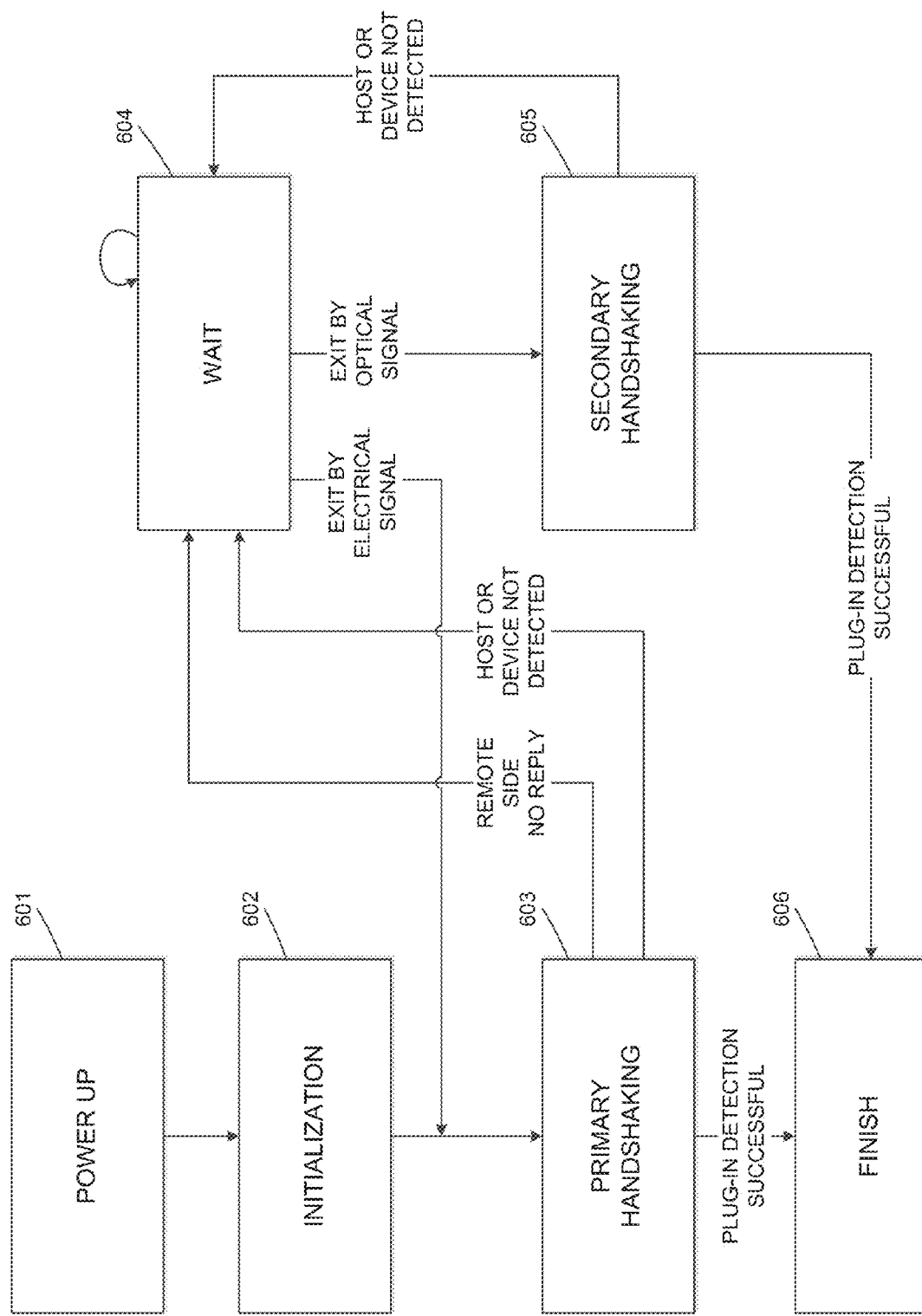
FIG. 6B is a flow chart illustrating a method for plug-in detection using the AOC connector plug according to another embodiment of the present patent application.
Figure 9:
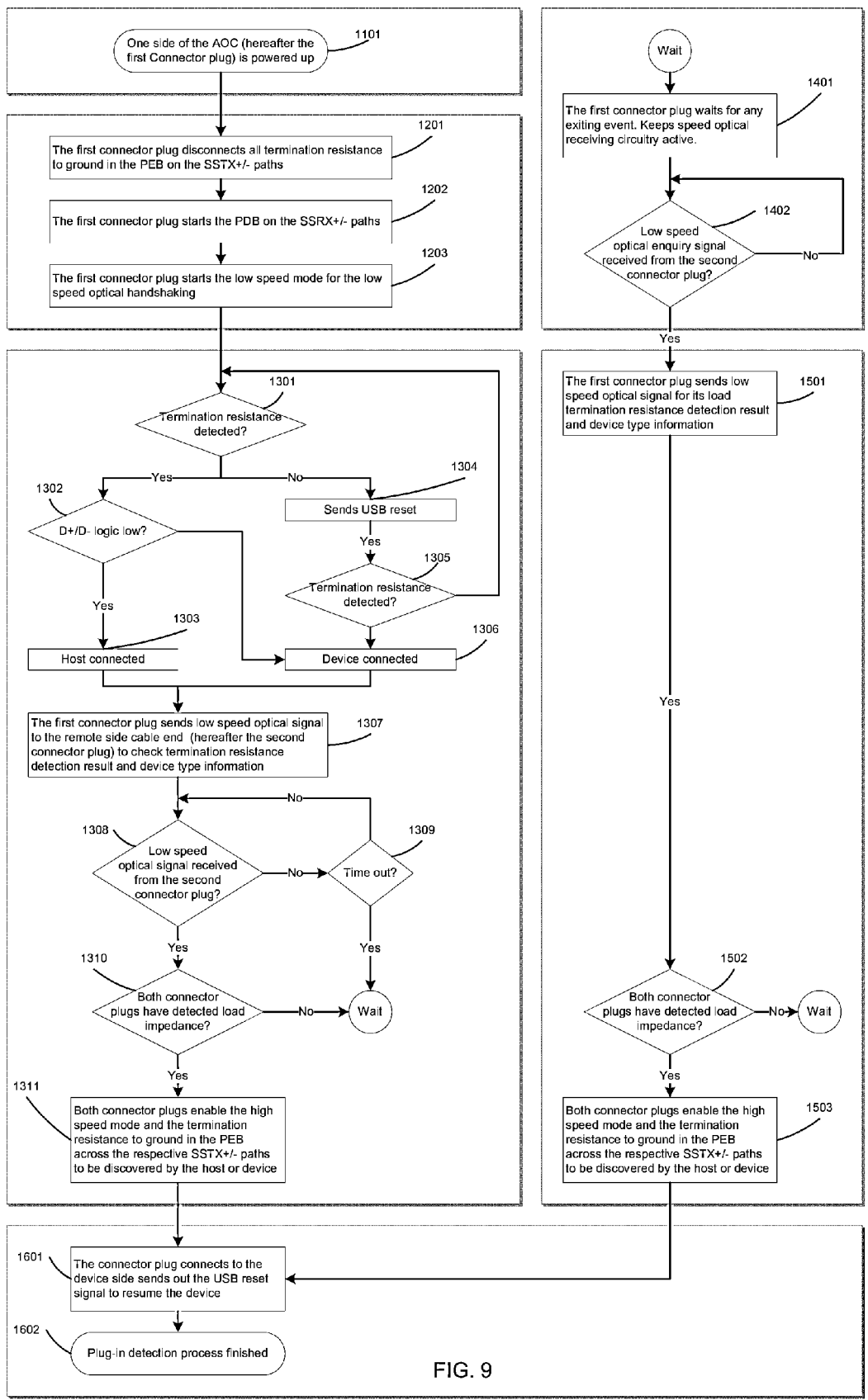
FIG. 9 illustrates an operation flow of the USB 3.0 AOC with plug-in detection according to another embodiment of the present patent application.

FIG. 6A is a flow chart illustrating a method for plug-in detection using the AOC connector plug according to another embodiment of the present patent application. FIG. 6A is a general operation flow, showing the fundamental processes for plug-in detection in various embodiments of the present patent application with different standards. Depending on the standard, the state transition between the fundamental processes can be different. For example, in another embodiment as illustrated in FIG. 6B, an optional state transition driven by the exit event of electrical signal is used in the implementation of the AOC for the USB 3.0 standard. Each of the fundamental processes can be formed by multiple steps, as shown in FIG. 9 for the USB 3.0 standard and FIG. 12 for the HSIO standard, which will be described in more detail hereafter. Similarly, depending on the standards, the number of steps and the state transitional relationships between the steps can be different.

Referring to FIG. 6A, the method for plug-in detection using the AOC connector plug includes the following processes.

Power Up (601):

One side of the AOC is powered up (by the connected host, another device, or an external power source). This end is referred to as "the first connector plug" hereafter.

Initialization (602):

The first connector plug will first disable the electrical properties in the PEB 42 so that the AOC will not be detected by the host (or the other device) before the two connector plugs are in synchronization and devices are connected properly at both ends. The first connector plug starts up the PDB circuitry 41. The first connector plug starts the low speed mode in order to perform the optical handshaking and information exchange with the connector plug on the other side (referred to as "the second connector plug" hereafter) during the plug-in detection process.

Primary Handshaking (603):

Normally, this process is triggered by connector plug powering up. In another embodiment as shown in FIG. 6B, this process can also be triggered by the exiting event of the AOC connector plug while it is in the WAIT (604) mode, which will be described in more detail hereafter.

The process of PRIMARY HANDSHAKING includes the following steps.

Detection: The first connector plug will actively detect the electrical properties of the host or the other device connected by the PDB.

Handshaking: The first connector plug will handshake with the second connector plug to exchange the detection result. To comply with the USB 3.0 standard, it's also necessary to exchange the device type, e.g. host, or peripheral device in order to determine whether a specific interaction with the host or device is required.

To complete the handshaking, both the first and the second connector plugs have to send and receive the low speed optical signals for their latest detection results and the device information with the other connector plug. Otherwise, it is considered as "no response" from the other connector plug and the system will go into the WAIT mode.

Emulation: The first connector plug will emulate the electrical properties in its PEB 42 based on the detection result received from the second connector plug. When PEB emulates the electrical properties, the connected host or device will see the same signal response as if the host or device is connected to the remote device with a copper cable.

WAIT Mode (604):

At the event that the handshaking fails, there is no response from the second connector plug, or both sides have not been connected to the devices, the first connector plug will enter this mode. This will usually happen when only the first connector plug has been plugged to a host or a device while the remote side or the second connector plug has not been plugged in yet. In this mode, the first connector plug will wait for the incoming optical signal from the second connector plug, which represents that the second connector plug has been connected and powered up and the handshaking can be restarted. This will drive the first cable end to enter the SECONDARY HANDSHAKING 605 as described in more detail hereafter.

In another embodiment, as shown in FIG. 6B, the first cable end can also monitor the level change of an external signal input from the connected host or device to exit to the PRIMARY HANDSHAKING 603. For example, in the HSIO standard, the first cable will monitor the LSR2P TX level and exit the WAIT mode when a level change is detected.

In another embodiment, the first cable end can power down unnecessary circuitries to save power, for example, the electrical-to-optical circuitry for the low speed mode. When exiting the WAIT mode 604, the low speed electrical-to-optical circuitry will be restarted.

In another embodiment, the first connector plug could enter a further power saving sleep mode from which it can be waken up either by the incoming optical signal or the external signal level change from the connected host or device.

Secondary Handshaking (605)

The SECONDARY HANDSHAKING process 605 is similar to the PRIMARY HANDSHAKING process 603, but it is triggered by an incoming optical signal from the second connector plug when the first connector plug is in the WAIT mode.

Finish (606):

The FINISH process 606 is the final process of the plug-in detection when both connector plugs have been connected appropriately to the hosts or devices and have passed either the PRIMARY HANDSHAKING process 603 or the SECONDARY HANDSHAKING process 605. Depending on different standards, some additional processes may be carried at this stage. For example, a USB Bus Reset signal will be sent out to resume the device when the AOC plug-in detection has been finished.

In another embodiment in which the AOC is having power and ground wires to carry power, the both connector plugs are powered simultaneously. Since the low speed optical signals can be transmitted and received individually by the two connector plugs simultaneously through different optical fibers and the cable controllers are fast enough to handle the simultaneous transmitting and receiving low speed optical signals, both connector plugs can follow the above operation flow at the same time.

Figure 7:
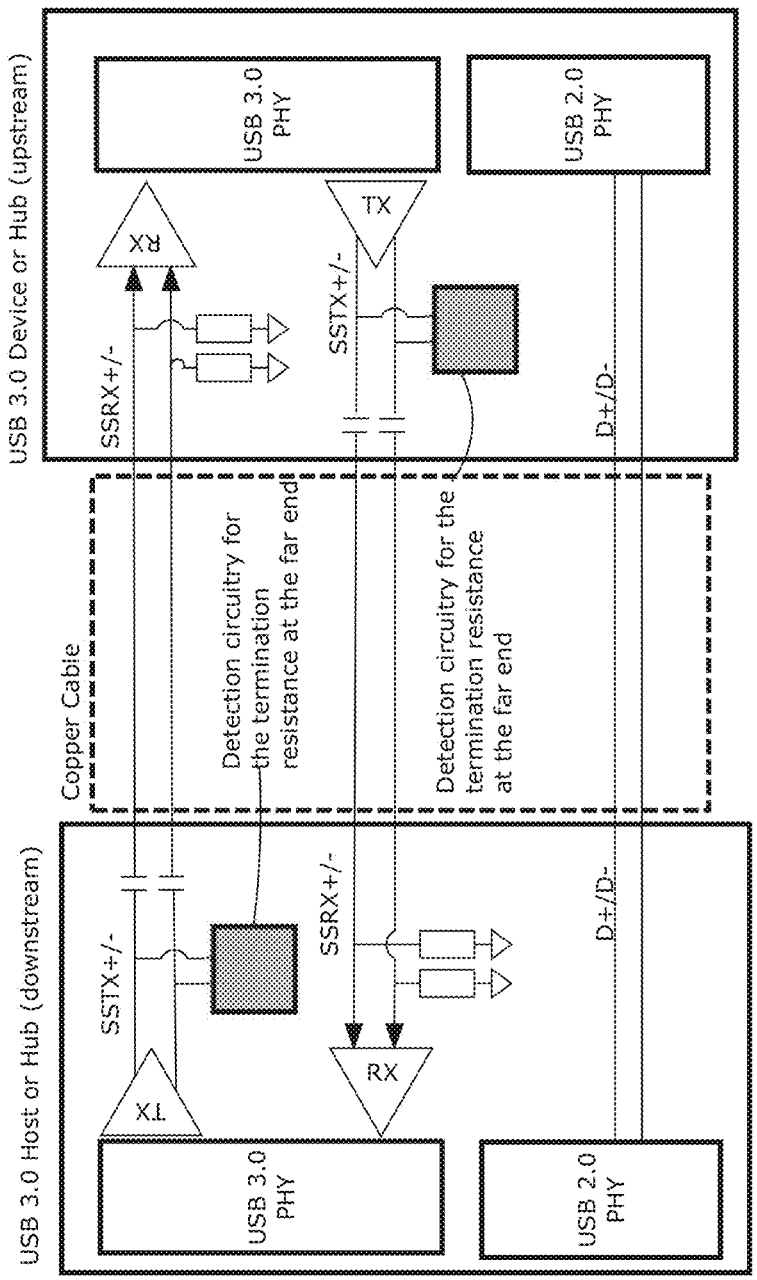
FIG. 7 is a block diagram illustrating a detection mechanism for USB 3.0 system with a conventional copper cable.
Figure 8:
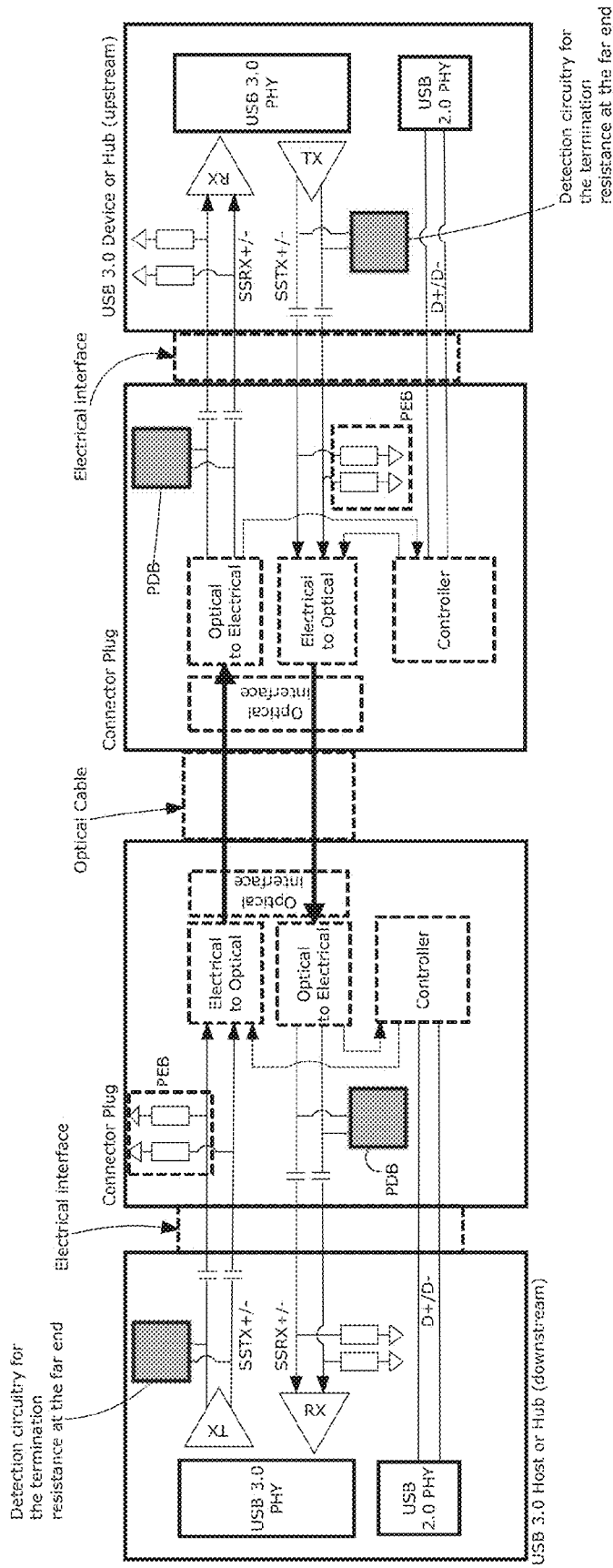
FIG. 8 is a block diagram illustrating the implementation of USB 3.0 system using the AOC connectors plug according to another embodiment of the present patent application.

FIG. 7 is a block diagram illustrating a detection mechanism for USB 3.0 system with a conventional copper cable. FIG. 8 is a block diagram illustrating the implementation of USB 3.0 system using the AOC connector plugs according to another embodiment of the present patent application. Referring to FIG. 7, in USB 3.0 the receiver detection circuit is implemented as part of a transmitter locating across the SSTX+/− paths to detect the presence of load impedance (or an equivalent DC resistance) at the far end which is locating across the SSRX+/− paths. When the transmitter has detected the existence of the far end load impedance, it will go to the Rx.Detect stage and the links SSTX+/− and SSRX+/− will start the transmission of the handshaking signals.

By adopting the AOC implementation as shown in FIG. 8, the AOC is having the PDB and PEB internally, where the PDB is located across the host or device SSRX+/− paths so as to detect the load impedance and the PEB is located across the host or device's SSTX+/− paths so as to emulate the load impedance to be used by the system's receiver detection algorithm. Both connector plugs contain a controller block, which is connected to the PEB and PDB blocks to detect and control and the described PEB/PDB functions. In some devices having external power supplies, there will be two cases that will cause the device to enter the SS.Disabled state. The first case is that the user connects the device to power before the cable is attached. The second case is that the user has connected the cable to the device only and powered up the device. In SS.Disable state, the device is required to be resumed by a Bus Reset signal through the D+/D− pins. The controller block is connected to the D+/D− pins to provide the required Bus Reset signal to resume the device. Specifically, both D+/D− are pulled low to reset the device. Moreover, the D+/D− pins are also monitored by the controller block to distinguish the device type. More specifically, the host device will have these pins set at logic low and the device will have either D+ or D− pin pulled high. The controller block is also connected to the electrical-to-optical and optical-to-electrical circuitries so that it can control the electrical-to-optical and the optical-to-electrical circuitries to enter the high speed mode or low speed mode. Detailed implementation flow is described hereafter.

FIG. 9 illustrates an operation flow of the USB 3.0 AOC with plug-in detection according to another embodiment of the present patent application. Referring to FIG. 9, the operation flow includes the following steps.

Step 1101: One side of the AOC (hereafter the first connector plug) is plugged to the USB 3.0 Host or Device and is powered up.

Step 1201: The first connector plug disconnects all termination resistance to ground in the PEB on the SSTX+/− paths.

Step 1202: The first connector plug starts the PDB circuitry on the SSRX+/− paths.

Step 1203: The first connector plug starts the low speed mode for the low speed optical handshaking with the connector plug on the remote side by setting up its internal circuitry to be ready to transmit and receive the low speed optical signals. Depending on how much information to be transferred during the plug-in detection process, the low speed optical signals can be designed in any format to meet the communication timing and power consumption requirements, e.g. a single or series of short pulses, a single or series of packets with specific bit rate.

Step 1301: The first connector plug detects the termination resistance on the SSRX+/− paths. If the termination resistance is detected, go to step 1302; otherwise go to step 1304.

Step 1302: The first connector plug detects the voltage levels on the D+/D− paths. If both D+/D− are logic low, go to step 1303; otherwise go to step 1306.

Step 1303: The host is connected; go to step 1307.

Step 1304: The first connector plug sends a USB Bus Reset signal through the D+/D− paths by holding down both pins to low for at least 10 ms.

Step 1305: The first connector plug detects again the termination resistance on the SSRX+/− paths. If the termination resistance is detected, go to step 1306; otherwise go to step 1301.

Step 1306: The device is connected; go to step 1307.

Step 1307: The first connector plug sends low speed optical signal to remote side connector plug (hereafter referred to as the second connector plug) for announcing the termination resistance detection result and the device type information.

Step 1308: The first connector plug should receive the low speed optical signal from the second connector plug within a certain period of time. The first connector plug may optionally activate its internal timer for accurate timing control and wait for signal until the time out. If the low speed optical reply signal is received before time out, go to step 1310; otherwise go to step 1309.

Step 1309: If it is time out, then it means the second connector plug has not been powered up. Go to step 1401; otherwise go to step 1308 to check again.

Step 1310: If both connector plugs have detected impedance on the respective SSRX+/− paths, go to step 1314; otherwise go to step 1401.

Step 1311: Both connector plugs enable the high speed mode and the termination resistance to ground in the PEB across the respective SSTX+/− paths to be discovered by the host or device. Go to step 1601.

Step 1401: This is the WAIT mode. The first connector plug waits here until an incoming optical signal is received from the second connector plug. In this stage, the first cable may optionally turn off the low speed electrical-to-optical circuitry or go into a sleep mode in order to save more power. The sleep mode could be exited by receiving the incoming optical signal from the second connector plug. Go to step 1402.

Step 1402: The first connector plug checks for the incoming low speed optical signals from the second connector plug. If yes, go to step 1501; otherwise stays in this step. Optionally, if the low speed electrical-to-optical circuitry has been powered down, it should be restarted on exit to the step 1501.

Step 1501: The first connector plug sends low speed optical signal for announcing its termination resistance detection result in step 1301 as well as the device type information in step 1303 or 1306.

Step 1502: If both connector plugs have detected termination resistance on the respective SSRX+/− paths, go to step 1503; otherwise go to step 1401.

Step 1503: Both connector plugs enable the high speed mode and the termination resistance to ground in the PEB across the respective SSTX+/− paths to be discovered by the host or device. Go to step 1601.

Step 1601: The connector plug being connected to the device sends out the USB reset signal to resume the device.

Step 1602: The plug-in detection process is finished.

Figure 10:
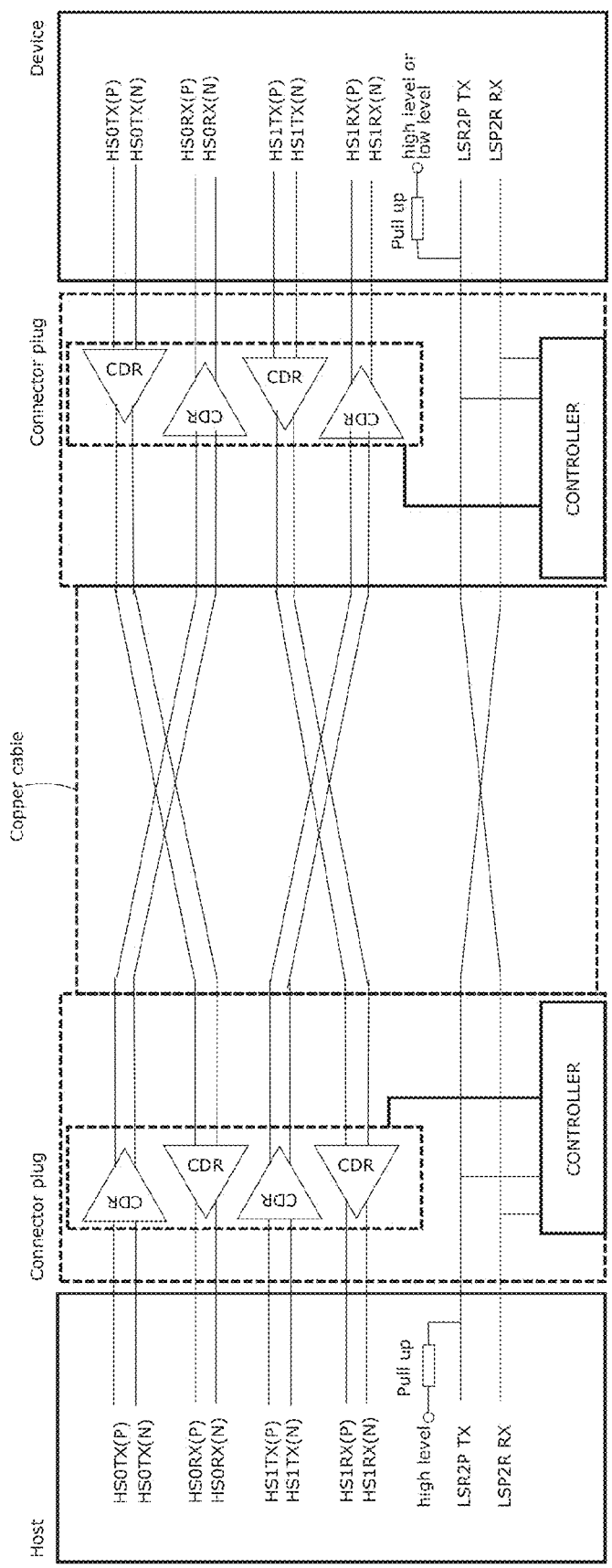
FIG. 10 illustrates a detection mechanism for HSIO system with a conventional copper cable.
Figure 11:
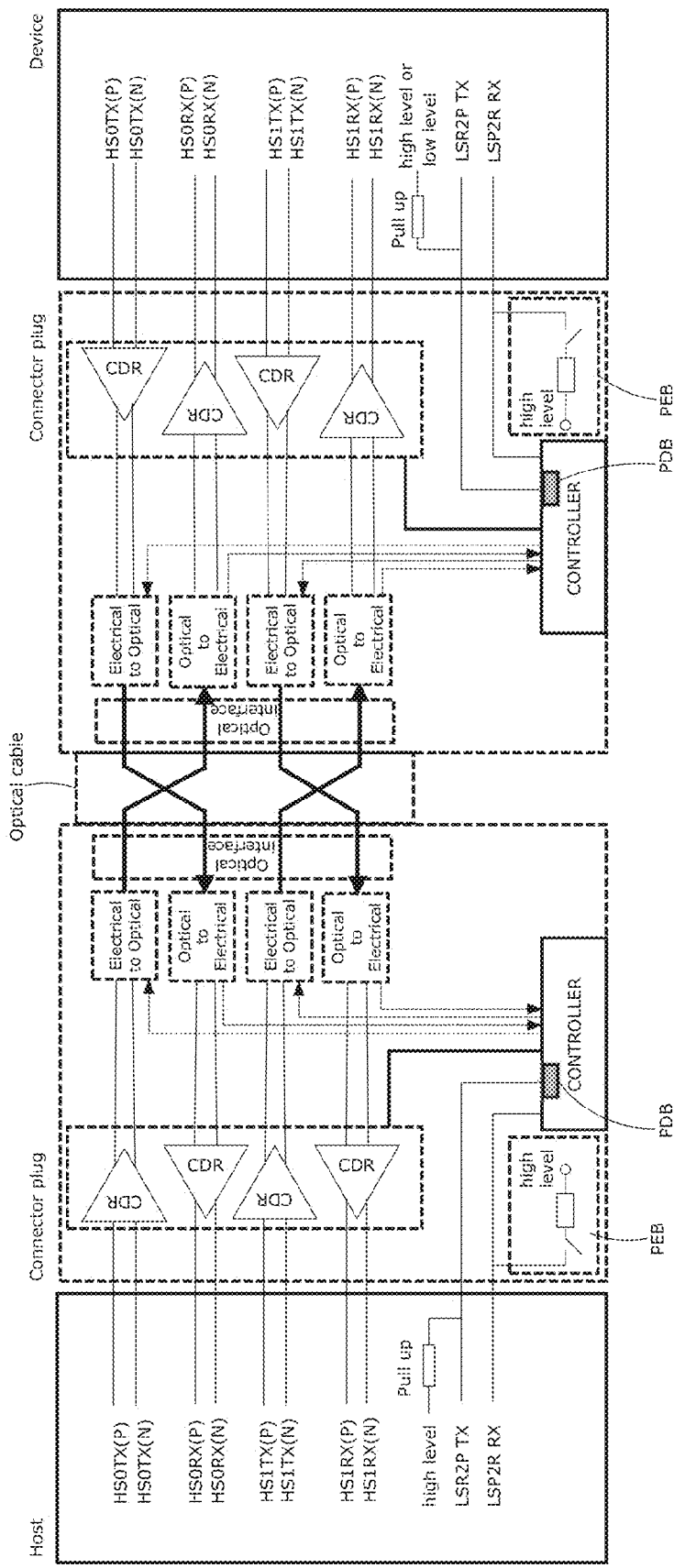
FIG. 11 is a block diagram illustrating the implementation of HSIO system using the AOC connector plugs according to another embodiment of the present patent application.

FIG. 10 illustrates a detection mechanism for HSIO system with a conventional copper cable. FIG. 11 is a block diagram illustrating the implementation of HSIO system using the AOC connector plugs according to another embodiment of the present patent application. Referring to FIG. 10, the cable has two active plugs at both ends and has four CDRs (clock and data recovery circuits) connecting to the high speed transmitting and receiving data paths, and one microcontroller for configuring the CDRs. Devices attached by the cable may provide pull-ups on their LSR2PTX pins. The pull-up on an LSR2PTX pin may be seen by a remote device on its LSP2R RX pin due to the crossover of these lines in the cable. This is used to identify whether the remote side of the cable has been connected to a host or device.

Specifically, a host may enable its pull-up on its LSR2PTX, while devices pull their pull-ups on their LSR2PTX pins low. If a device sees a pull-up on its LSP2R RX pin, it knows it is connected to a host. It can then enable pull-up on LSR2PTX pins on each of its ports, thereby informing daisy-chained devices that there is a host connected somewhere upstream. In this way, when the host is removed, the pull-up on the LSR2PTX is removed, and the device again pulls its LSR2PTX pull-ups low, thereby informing daisy-chained devices that the host has been disconnected.

By adopting the AOC implementation as shown in FIG. 11, the AOC is having the PDB and PEB internally, wherein the PDB is located across the LSR2P TX path so as to detect voltage level and the PEB is located across the LSP2R RX path so as to emulate the LSR2P TX output level at the remote side to be used by the connecting host or device to determine whether a host or a device has been connected also at the remote side. Both connector plugs contain a controller block, which is connecting to the PEB and the PDB blocks to detect and control and the described PEB/PDB functions. Moreover, it is connected to the CDRs located on the high speed transmitting and receiving paths, the electrical-to-optical converter blocks connected to the transmitting side CDRs and the optical-to-electrical converter blocks connected to the receiving side CDRs so that it can control both the CDRs, the electrical-to-optical circuitry and the optical-to-electrical circuitry to enter the different modes as specified by the HSIO standard. A detailed implementation flow is described hereafter.

Figure 12:
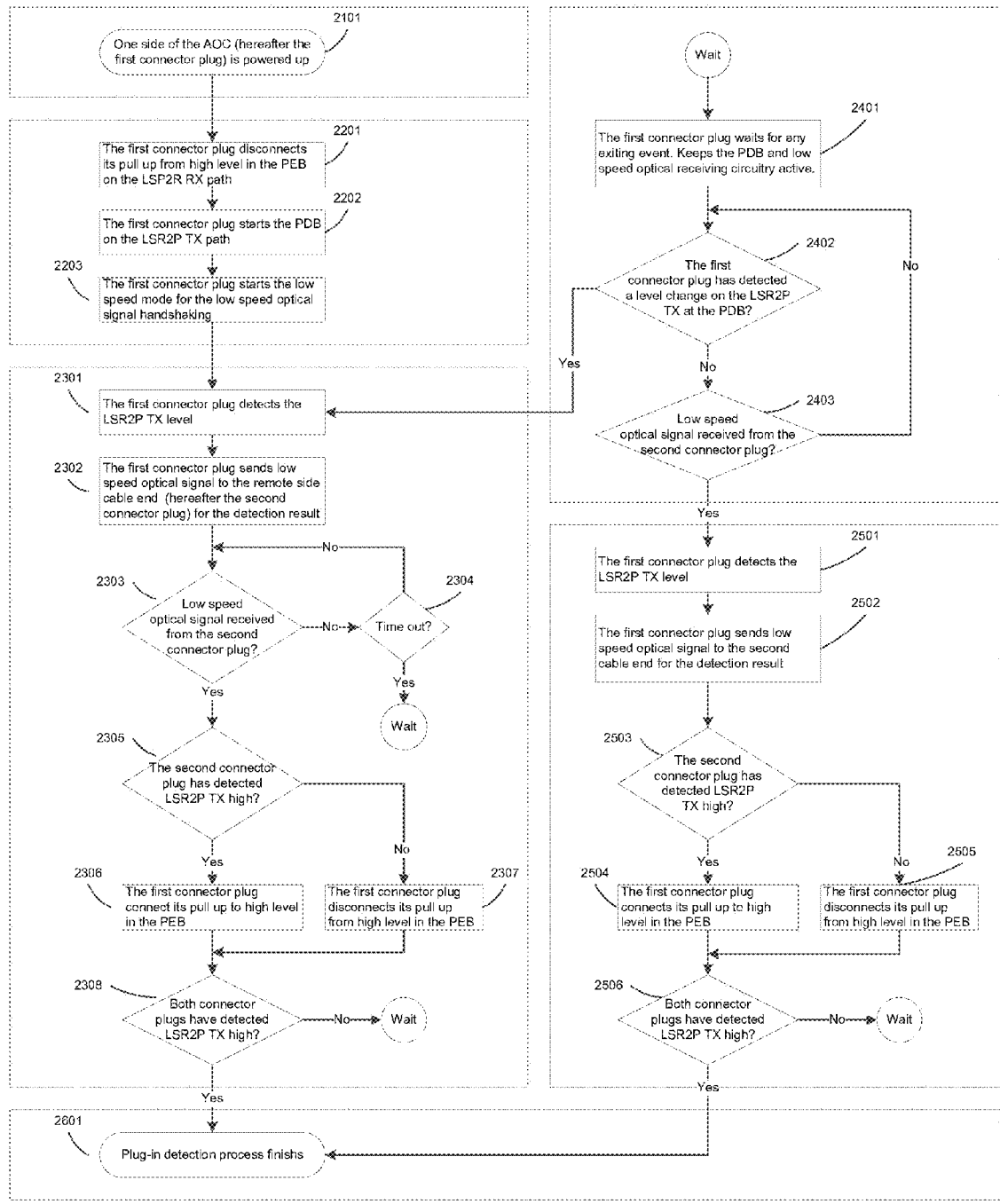
FIG. 12 illustrates an operation flow of the HSIO AOC with plug-in detection according to another embodiment of the present patent application.

FIG. 12 illustrates an operation flow of the HSIO AOC with plug-in detection according to another embodiment of the present patent application. Referring to FIG. 12, the operation flow includes the following steps.

Step 2101: One side of the AOC (hereafter referred to as the first connector plug) is plugged to the Host or Device and powered up.

Step 2201: The first connector plug disconnects its pull up from the high level defined by the HSIO standard.

Step 2202: The first connector plug starts the PDB on the LSR2P TX path.

Step 2203: The first connector plug starts the low speed mode in order to perform the handshaking with the connector plug on the remote side by setting up its internal circuitry to be ready to transmit and receive the low speed optical signals. Depending on how much information to be transferred during the plug-in detection process, the low speed optical signals can be designed in any format to meet the communication timing and power consumption requirements, e.g. a single or series of short pulses, a single or series of packets with specific bit rate.

Step 2301: The first connector plug detects the LSR2P TX level.

Step 2302: The first connector plug sends low speed optical signal to the remote side connector plug (hereafter referred to as the second connector plug) for announcing the LSR2P TX voltage level detected.

Step 2303: The first connector plug should receive the low speed optical reply signal from the second connector plug within a certain period of time. The first connector plug may optionally activate its internal timer for accurate timing control and wait for signal until the time out. If the low speed optical reply signal is received before time out, go to step 2305; otherwise go to step 2304.

Step 2304: If it is time out that means the second connector plug has not been powered up. Go to step 2401; otherwise go to step 2303 to check again.

Step 2305: If the second connector plug has announced that it has detected LSR2P TX high, then go to step 2306; otherwise go to step 2307.

Step 2306: The first connector plug connects its pull up to high level in the PEB on the LSP2R RX path.

In the detection mechanism with copper cable illustrated in FIG. 10, the host and device's LSR2P TX and LSP2R RX are connected to each other in a crossover way. To emulate the high voltage level seen by the second connector plug on the LSR2P TX path, the first connector plug should connect its pull up inside the PEB across the LSP2R RX path to a high voltage level defined by the HSIO standard. The first connector plug could be connected to a host or peripheral device that is not known by the AOC. According to the HSIO standard, a host device may enable its pull-up on its LSR2PTX, while devices pull their pull-ups on their LSR2PTX pins low. When a peripheral device sees a high level on the LSP2R RX, it knows that it is connected to a host device. It then enables its pull-up on the LSR2P TX pins on each of its ports. After the first connector plug has enable its pull inside the PEB across the LSP2R PX path, the voltage level on the LSP2R TX may change after a certain period of time.

After this step, go to step 2308.

Step 2307: The first connector plug disconnects its pull up from high level in the PEB on the LSP2R RX path. Go to step 2401.

Step 2308: If both connector plugs have detected LSR2P TX high, then go to step 2601; otherwise go to step 2401.

Step 2401: The first connector plug waits here until an incoming optical signal is received from the second connector plug or a signal level change on the LSR2P TX path from the connected host or device. In this stage, the first cable may optionally turn off the low speed electrical-to-optical circuitry or go into a sleep mode in order to save more power. The sleep mode could be exited by receiving the incoming optical signal from the second connector plug or by detecting any external signal level change. Go to step 2402.

Step 2402: If the first connector plugs has detected a signal level change on the LSR2P TX at the PDB, go to step 2301; otherwise go to step 2403. If the low speed transmitter circuitry has been powered down in step 2401, it should be restarted before going to step 2301.

Step 2403: The first connector plug detects whether there is an incoming low speed optical signal form the second connector plug. Normally, this is the low speed optical signal from the second connector plug when it is either being powered up, or being triggered to restart to send this signal by the events of detecting a level change on its LSR2P TX path. If yes, go to step 2501; otherwise go back to step 2402. If the low speed transmitter circuitry has been powered down in step 2401, it should be restarted before going to step 2501.

Step 2501: The first connector plug detects the LSRSP TX level.

Step 2502: The first connector plug sends low speed optical signal for announcing its detection result.

Step 2503: If the second connector plug has announced that it has detected LSR2P TX high, then go to step 2504; otherwise go to step 2505.

Step 2504: The first connector plug connects its pull up to high level in the PEB on the LSP2R RX path. Go to step 2506.

Step 2505: The first connector plug disconnects its pull up from high level in the PEB on the LSP2R RX path. Go to step 2506.

Step 2506: If both connector plugs have detected LSR2P TX high, then go to step 2601; otherwise go to step 2401.

Step 2601: Plug-in detection process finished.

Figure 13:
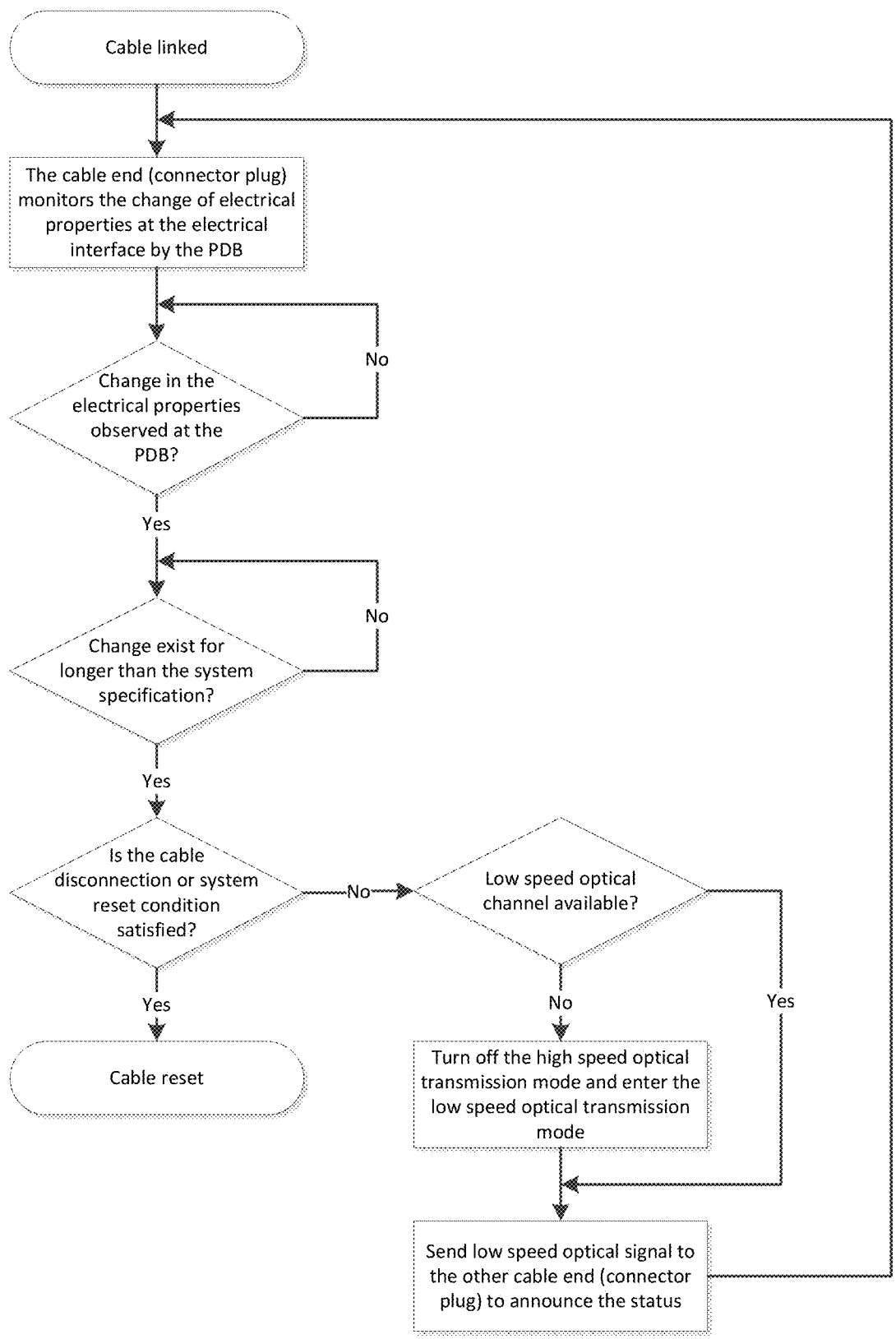
FIG. 13 is a flow chart illustrating the cable or link down condition monitoring process.

FIG. 13 is a flow chart illustrating the cable or link down condition monitoring process. Referring to FIG. 13, after the link is setup, the AOC keeps monitoring the PDB block to determine whether the system is going to a low power mode or a cable disconnection is made. In USB 3.0, the device will have its receiver termination in high impedance when it is either reset or has its port disabled. In HSIO, the AOC's PDB will continue to detect the level on the LSR2P TX at both sides, e.g. when the host is removed, the pull-up on the LSR2PTX is removed, and this status will be forwarded to the other side of the cable to notify the system about the disconnection event.

Features of the AOC connector plug and the method in the above embodiments include: active device connection by AOC; being fully compatible to existing system device detection protocol, no modification required; emulating electrical properties to be detected by host or device; inter AOC connector plugs synchronization and timing control for enabling/disabling of the electrical properties; supporting different modes to save power consumption: sleep mode, low speed (optical transmission) mode, and high speed (optical transmission) mode.

In the above embodiments, the AOC has the capability of actively detecting the plug-in and the type of the attached node at both sides of the cable, performing internal communication between two connector plugs to determine the connection status at both connector plugs, emulating the far-end electrical properties at the near-end to initiate communication between the two attached nodes, and switching on/off the plug-in emulation blocks. The AOC can be used to replace the copper cable with full compatibility, without the requirement of modifying the system protocol.

While the present patent application has been shown and described with particular references to a number of embodiments thereof, it should be noted that various other changes or modifications may be made without departing from the scope of the present invention.

What is claimed is:

1. An active optical cable connector plug comprising:
    an electrical interface configured to connect to a first electronic device;
    an optical interface configured to connect to an optical cable, the optical cable being configured to connect to a second electronic device;
    an electrical-to-optical circuitry being connected with the electrical interface and the optical interface and configured to convert a received electrical signal to an optical signal;
    an optical-to-electrical circuitry being connected with the electrical interface and the optical interface and configured to convert a received optical signal to an electrical signal;

a plug-in detection block being connected to the electrical interface and configured to detect the electrical properties of the first electronic device;

a plug-in emulation block being connected to the electrical interface and configured to emulate the electrical properties of the second electronic device; and a controller connected to and thereby controlling the electrical-to-optical circuitry, the optical-to-electrical circuitry, the plug-in detection block, and the plug-in emulation block so as to transmit the detected electrical properties of the first electronic device to the second electronic device through the optical interface, and to transmit the emulated electrical properties of the second electronic device to the first electronic device through the electrical interface;

when used in a HSIO (High Speed I/O) system, the plug-in detection circuitry is located across a LSR2P TX path so as to detect a voltage level and the plug-in emulation circuitry is located across a LSP2R RX path so as to emulate a LSR2P TX output level at a remote side.

2. The active optical cable connector plug of claim 1, wherein the controller is configured to transmit an electrical signal to the electrical-to-optical circuitry, and the electrical-to-optical circuitry is configured to convert the electrical signal to an optical signal and transmit the optical signal through the optical interface in a low speed mode.

3. The active optical cable connector plug of claim 2, wherein the optical-to-electrical circuitry is configured to convert an optical signal received from the optical interface to an electrical signal, and the controller is configured to receive the electrical signal from the optical-to-electrical circuitry in the low speed mode.

4. The active optical cable connector plug of claim 1, wherein the electrical-to-optical circuitry is configured to convert a differential electrical signal received from the electrical interface to an optical signal and to transmit the optical signal through the optical interface in a high speed mode.

5. The active optical cable connector plug of claim 4, wherein the electrical-to-optical circuitry comprises clock and data recovery circuits.

6. The active optical cable connector plug of claim 4, wherein the optical-to-electrical circuitry is configured to convert an optical signal received from the optical interface to a differential electrical signal, and to transmit the differential electrical signal to the electrical interface in the high speed mode.

7. The active optical cable connector plug of claim 5, wherein the optical-to-electrical circuitry comprises clock and data recovery circuits.

8. The active optical cable connector plug of claim 1, wherein the optical interface is configured to connect to at least two optical fibers of the optical cable, the optical cable is further configured to connect to an optical interface of a second active optical cable connector plug, and the second active optical cable connector plug is configured to connect to the second electronic device.

9. The active optical cable connector plug of claim 8, wherein the controller is configured to enter a wait mode when there is no response from the second active optical cable connector plug, or either one of the first and second electronic devices has not been detected by the optical cable, and to exit the wait mode when there is an incoming optical signal from the second active optical cable connector plug.

10. The active optical cable connector of claim 9, wherein the controller is configured to turn off the electrical-to-optical circuitry in the wait mode to save power, and to restart the electrical-to-optical circuitry when exiting the wait mode.

11. The active optical cable connector plug of claim 9, wherein the controller is configured to exit the wait mode when there is a predetermined level change in an external signal input from the first electronic device.

12. The active optical cable connector plug of claim 1, wherein the electrical interface complies with the USB 3.0 standard, and the electrical properties of the first electronic device detected by the plug-in detection block comprise the device type information.

13. The active optical cable connector plug of claim 1, wherein the plug-in emulation block is configured to emulate the electrical properties of the second electronic device based on the electrical response of connecting a copper cable between the first electronic device and the second electronic device.

14. An active optical cable comprising:

an optical cable comprising at least two fibers with a far end and a near end;

a first connector plug connecting to the near end of the optical cable; and a second connector plug connecting to the far end of the optical cable; wherein:

the first connector plug is configured to connect to a first electronic device;

the second connector plug is configured to connect to a second electronic device; and each of the first and second connector plugs comprises:

an electrical interface configured to connect to the first electronic device at the near end;

an optical interface configured to connect to the at least two optical fibers in the optical cable;

an electrical-to-optical circuitry being connected with the electrical interface and the optical interface and configured to convert a received electrical signal to an optical signal;

an optical-to-electrical circuitry being connected with the electrical interface and the optical interface and configured to convert a received optical signal to an electrical signal;

a plug-in detection block being connected to the electrical interface and configured to detect the electrical properties of the first electronic device and transmit the detected electrical properties to the second electronic device;

a plug-in emulation block being connected to the electrical interface and configured to emulate the electrical properties of the second electronic device; and a controller connected to and thereby controlling the electrical-to-optical circuitry, the optical-to-electrical circuitry, the plug-in detection block, and the plug-in emulation block so as to transmit the detected electrical properties of the first electronic device to the second electronic device through the optical interface, and to transmit the emulated electrical properties of the second electronic device to the first electronic device through the electrical interface;

when used in a HSIO (High Speed I/O) system, the plug-in detection circuitry is located across a LSR2P TX path so as to detect a voltage level and the plug-in emulation circuitry is located across a LSP2R RX path so as to emulate a LSR2P TX output level at a remote side.

15. The active optical cable of claim 14, wherein the controller is configured to transmit an electrical signal to the electrical-to-optical circuitry, the electrical-to-optical circuitry is configured to convert the electrical signal to an optical signal and transmit the optical signal to the far-end electronic device in a low speed mode.

16. The active optical cable of claim 15, wherein the optical-to-electrical circuitry is configured to convert a received optical signal to an electrical signal, and the controller is configured to receive the electrical signal from the optical-to-electrical circuitry in the low speed mode.

17. The active optical cable of claim 14, wherein the electrical-to-optical circuitry is configured to convert a differential electrical signal received from the electrical interface to an optical signal and to transmit the optical signal through the optical interface in a high speed mode.

18. The active optical cable of claim 17, wherein the electrical-to-optical circuitry comprises clock and data recovery circuits.

19. The active optical cable of claim 17, wherein the optical-to-electrical circuitry is configured to convert an optical signal received from the optical interface to a differential electrical signal, and to transmit the differential electrical signal to the electrical interface in the high speed mode.

20. The active optical cable of claim 18, wherein the optical-to-electrical circuitry comprises clock and data recovery circuits.

21. The active optical cable of claim 14, wherein the controller is configured to enter a wait mode when there is no response from the second connector plug, or either one of the first and second electronic devices has not been detected by the optical cable, and to exit the wait mode when there is an incoming optical signal from the second connector plug.

22. The active optical cable of claim 21, wherein the controller is configured to turn off the electrical-to-optical circuitry in the wait mode to save power, and to restart the electrical-to-optical circuitry when exiting the wait mode.

23. The active optical cable of claim 21, wherein the controller is configured to exit the wait mode when there is a predetermined level change in an external signal input from the first electronic device.

24. The active optical cable of claim 14, wherein the electrical interface complies with the USB 3.0 standard, and the electrical properties of the first electronic device detected by the plug-in detection block comprise the device type information.

25. The active optical cable of claim 14, wherein the plug-in emulation block is configured to emulate the electrical properties of the first electronic device based on the electrical response of connecting a copper cable between the first electronic device and the second electronic device.

26. The active optical cable of claim 14, wherein the optical cable comprises power and ground wires.

* * * * *